Oct. 3, 1944.    L. A. BASHARA    2,359,607
BURR CUTTING TOOL
Filed Aug. 14, 1943
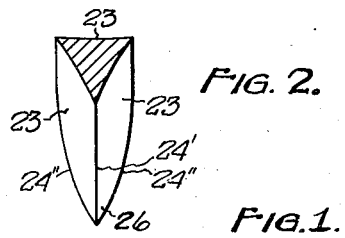
FIG. 2.
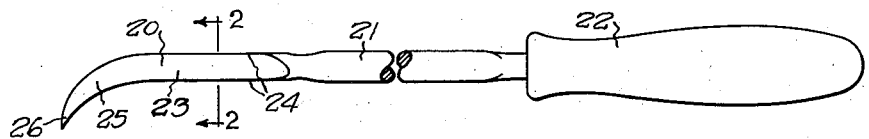
FIG. 1.
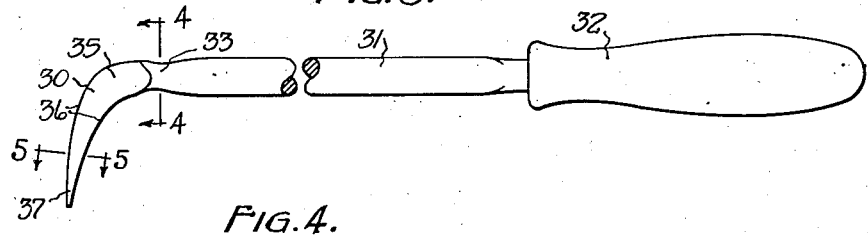
FIG. 3.
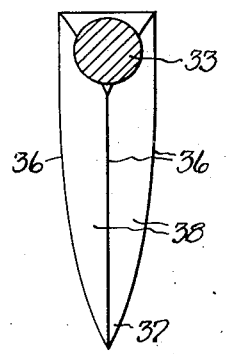
FIG. 4.
FIG. 5
LAURENCE A. BASHARA.
INVENTOR.
BY Oltsch & Knoblock
Attorneys.

Patented Oct. 3, 1944

2,359,607

UNITED STATES PATENT OFFICE 2,359,607

BURR CUTTING TOOL

Laurence A. Bashara, Portage Township, St. Joseph County, Ind.

Application August 14, 1943, Serial No. 498,740

3 Claims. (Cl. 30—169)

This invention relates to a burr cutting tool.

In the manufacture of various types of devices such as valves, pumps, carburetors, impellers and the like, it is frequently necessary to perform a large number of drilling, milling, chamfering, broaching and other operations upon a casting or other piece to form passages, channels, grooves and the like therein. This generally entails the formation of multiple passages which may communicate with each other or with interior cavities or the like. The machining operations, particularly when the casting is formed of nonferrous material, such as an aluminum or a magnesium alloy, result in the formation of burrs at the intersections of the passages or at the inner ends of the passages. Such burrs must be completely removed before the device is assembled and placed in use, because the burrs are subject to break away in course of use, and be entrained in a fluid line, where they may cause serious damage by blocking fluid flow through restricted ports, etc., or become lodged in the path of moving parts of the device. Thus considering an aircraft carburetor or a supercharger, it will be apparent that burrs released therefrom incident to fluid flow at high velocity or pressure, or incident to vibration or impact, may cause failure of the aircraft in flight, as by clogging a fuel line, scoring of engine cylinders, or by wedging or locking between moving engine parts.

Various methods and tools have been used heretofore in an attempt to effectively clean a work piece of such burrs. However, these have not been found to be fully satisfactory to cut, trim or remove all interior burrs because of the multiplicity of conditions under which burrs are formed, because of the inaccessible location of the burrs interiorly of a casting and because of the difficulty in so manipulating a tool under conditions where different angles, shapes and other factors are encountered with different machined parts.

Therefore, it is the primary object of this invention to provide a simple, inexpensive tool so shaped that it may be inserted into a passage of a work piece and manipulated to effectively cut a burr within the work piece.

A further object is to provide a cutting tool having a plurality of cutting edges each adapted to afford access to an interior location of a work piece.

A further object is to provide a tool of this character of substantially triangular cross section presenting three sharp cutting edges defined by transversely concave surfaces therebetween.

A further object is to provide a tool of this character having an elongated tapered cutting head of triangular cross section bent along its length to desired shape.

Other objects will be apparent from the description and appended claims.

In the drawing:

Fig. 1 is a side view of one form of the tool.

Fig. 2 is a transverse sectional view taken on line 2—2 of Fig. 1.

Fig. 3 is a side view of a third form of the tool.

Fig. 4 is a transverse sectional view taken on line 4—4 of Fig. 3.

Fig. 5 is a transverse sectional view taken on line 5—5 of Fig. 3.

Referring to the drawing which illustrates various embodiments of my invention the embodiment of the tool is shown in Figs. 1 and 2. In this tool the cutting head 20 is comparatively short, and shank 21 connected to handle 22 is comparatively long and preferably of circular cross section. Cutting head 20 is of triangular cross section with its faces 23 slightly concave transversely thereof to define the sharp longitudinal cutting edges 24. The end portion 25 of the cutting head is bent in a gradual curve and tapers to a point 26 at which cutting edges 24 merge in gradual longitudinal curves.

It will be observed that the embodiment shown in Figs. 1 and 2 presents both straight and curved cutting edges, and that the curved portions of the cutting edges differ, i. e. inner curved edge 24' is of different shape than side cutting edges 24", and each can be used for access to different points in a casting or other work piece. For example, inner edge portion 24' may lie in a plane common to the axes of the straight and bent portions of the tool, to be used for cutting burrs at a shoulder formed between the passage through which the tool is inserted and another passage communicating therewith and assuming the characteristics of an undercut; while edges 24" may be used for cutting burrs within a cavity at the side thereof opposite that with which the tool-receiving passage communicates. Also, the straight portions of the various cutting edges may be of importance, together with the curved portions, in various constructions of work pieces.

The embodiment of the tool shown in Figs. 3 to 5 includes cutting head 30, shank 31 and handle 32. Shank 31 is shown as elongated and of circular cross section, having a slightly reduced neck 33 from which cutting head 30 projects. The cutting head extends at a sharp angle to the shank, and includes sharply bent portion 35 from which cutting edges 36 extend in converging relation to point 37, said edges preferably being slightly curved. The cutting head is of triangular cross section as shown in Fig. 5, defined by transversely concave faces 38.

This form of tool is particularly adapted for access to undercut surfaces, such as slots of T-shape, dovetailed openings, and the like.

Each of the tools is preferably made from tool steel treated to produce the requisite properties, such as hardness, after shaping of the blank by forging or the like. The faces are ground to sharpen the edges, and the tool can be resharpened as necessary by regrinding the faces of its cutting head.

The shapes of the tool shown herein are merely illustrative. Thus the tools are customarily supplied in sets, each tool in a set differing from the other tools in one or more particulars. Thus different tools in a set may be of different sizes for use in large or small passages, or the shanks may be of different lengths, or the cutting heads may differ. A wide range of variation in cutting heads is possible and may be required. Thus curved cutting heads may differ as to radius of curvature, length of curve, length of straight cutting portion merging with the curved portion thereof. Also, the cutting heads of tools of the type shown in Fig. 3 may extend at different angles from the tool shank, and a set may include tools of this type having heads in acute angled relation to the shank. However, in all embodiments, the transverse triangular cross section, the tapered form, the pointed or substantially pointed end, and the longitudinal cutting edges are present. The transverse concavity of the faces between the cutting edges is also common to most forms. This concavity may vary in different tools, but is preferably held slight in all instances to insure requisite tool sharpness without sacrifice of strength necessary to work upon rough metal surfaces and edges for cutting purposes.

I claim:

1. In a tool for removing burrs from interior openings of a machined metal part, an elongated cutting head of triangular cross section throughout defining longitudinal cutting edges converging at one end to define a pointed portion, a portion of said cutting head being bent to present a central inner cutting edge and a pair of outer cutting edges.

2. In a tool for removing burrs from interior openings of a machined metal part, an elongated body comprising a shank and a cutting head, said cutting head having a triangular cross sectional shape throughout to define three longitudinal cutting edges and including a tapering bent end portion, one of said cutting edges lying in a plane common to the axes of said shank and bent portion.

3. In a tool for removing burrs from interior openings of a machined metal part, an elongated body having a straight portion and a bent end portion, at least said end portion being of triangular cross section defined by transversely concave faces and defining longitudinal cutting edges converging toward the outer end thereof to define a pointed portion, the inner cutting edge lying in a plane common to the axes of said straight and bent portions.

LAURENCE A. BASHARA.